United States Patent
Naito et al.

(10) Patent No.: US 7,045,568 B2
(45) Date of Patent: *May 16, 2006

(54) AQUEOUS DISPERSION TYPE PRESSURE-SENSITIVE ADHESIVE COMPOSITION, AND PRESSURE-SENSITIVE ADHESIVE SHEET

(75) Inventors: Tomonari Naito, Ibaraki (JP); Akiko Miyano, Ibaraki (JP); Kazuhisa Maeda, Ibaraki (JP); Michio Umeda, Ibaraki (JP); Kenichi Okada, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/639,453

(22) Filed: Aug. 13, 2003

(65) Prior Publication Data
US 2005/0038152 A1    Feb. 17, 2005

(51) Int. Cl.
*C08F 8/00*    (2006.01)
(52) U.S. Cl. .................... 524/547; 428/41.3; 428/41.4; 428/41.5; 428/41.8; 524/588; 525/326.5
(58) Field of Classification Search ............... 428/41.3, 428/41.4, 41.5, 41.8; 524/547, 588; 525/326.5
See application file for complete search history.

(56) References Cited

U.S. PATENT DOCUMENTS

| | | | | |
|---|---|---|---|---|
| 5,128,386 A | * | 7/1992 | Rehmer et al. | ................ 522/35 |
| 5,514,435 A | * | 5/1996 | Suzuki et al. | .............. 428/41.5 |
| 5,852,095 A | * | 12/1998 | Yamauchi et al. | .......... 524/460 |
| 6,348,249 B1 | * | 2/2002 | Meyer | ........................ 428/41.8 |
| 6,506,489 B1 | * | 1/2003 | Ohura et al. | ................. 428/343 |

FOREIGN PATENT DOCUMENTS

| | | | |
|---|---|---|---|
| JP | 05-230428 | * | 7/1993 |
| JP | 2001-131511 A | | 5/2001 |
| JP | 200-317165 | * | 10/2002 |

* cited by examiner

*Primary Examiner*—Bernard Lipman
(74) *Attorney, Agent, or Firm*—Sughrue Mion, PLLC

(57) ABSTRACT

An aqueous dispersion type pressure-sensitive adhesive composition which has a small increase of a peel force to a release liner having a silicone release agent applied thereto or back coating layer, and pressure-sensitive adhesive sheets comprising the composition. The aqueous dispersion type pressure-sensitive adhesive composition comprises an aqueous dispersion of a polymer obtained by copolymerizing a monomer mixture comprising one or more alkyl (meth) acrylates as the main component and at least one silane monomer, and an organic compound capable of bonding to the silane monomer.

12 Claims, 1 Drawing Sheet

AQUEOUS DISPERSION TYPE PRESSURE-SENSITIVE ADHESIVE COMPOSITION, AND PRESSURE-SENSITIVE ADHESIVE SHEET

FIELD OF THE INVENTION

The present invention relates to an aqueous dispersion type acrylic pressure-sensitive adhesive composition and a pressure-sensitive adhesive sheet (in the form of a tape, sheet, film, etc.) comprising a substrate and disposed thereon a pressure-sensitive adhesive layer formed from the composition.

DESCRIPTION OF THE RELATED ART

Pressure-sensitive adhesive sheets obtained using an aqueous dispersion type pressure-sensitive adhesive have advantages, for example, that they are desirable from the standpoint of environmental health because of the nonuse of an organic solvent and are superior also in solvent resistance. In general, those pressure-sensitive adhesive sheets are produced by adding a crosslinking agent after completion of the polymerization of a monomer mixture comprising an acrylic monomer as the main component in order to adjust a solvent-insoluble content giving an influence to a holding power or the like of a pressure-sensitive adhesive layer, thereby preparing a pressure-sensitive adhesive composition, and applying the composition to a substrate. However, the thus obtained pressure-sensitive adhesive sheets had the problems that the solvent-insoluble content in a pressure-sensitive adhesive constituting a pressure-sensitive adhesive layer and the molecular weight of the solvent-soluble content in the pressure-sensitive adhesive vary with the lapse of time, and as a result, unsusceptibility to edge peeling (property that an edge portion is difficult to peel after adhering to an adherend) also varies. Further, such pressure-sensitive adhesive sheets obtained with an aqueous dispersion type pressure-sensitive adhesive composition have had a drawback that it is difficult to reconcile unsusceptibility to edge peeling and holding power as compared with pressure-sensitive adhesive sheets obtained with a solvent-based pressure-sensitive adhesive composition.

The present inventors made intensive investigations in order to eliminate the problem. As a result, they found that when an aqueous dispersion type monomer mixture containing an alkyl (meth)acrylate as a main component is polymerized with a silane monomer optionally in the presence of a chain transfer agent, a pressure-sensitive adhesive composition excellent in solvent-insoluble content, molecular weight of solvent-soluble content and stable unsusceptibility to edge peeling with the lapse of time can be obtained. In particular, they also found that when a specific proportion of a silane monomer is copolymerized with a monomer mixture comprising an alkyl (meth)acrylate as the main component and giving a resin composition having a specified value or less of a solvent insoluble content when polymerized, it is possible to reconcile excellent unsusceptibility to edge peeling and high holding power (JP-A 2001-131511).

The reasons why such excellent effects are exhibited are not always clear, but it is assumed as follows. Condensation reaction of a silicon atom-containing group in a silane monomer mainly occurs at a drying step after applying a pressure-sensitive adhesive composition to a substrate or the like, rather than at copolymerization (emulsion polymerization) with a monomer mixture comprising an alkyl (meth) acrylate as the main component, and therefore, a solvent-insoluble content does not produce excessively. As a result, an excellent holding property is exhibited, hydrolysis does not occur due to the absence of water after drying, and condensation reaction does not proceed. Due to this, structure and physical properties are difficult to vary, so that good stability with the lapse of time can be obtained.

In particular, in the case of copolymerizing a silane monomer with a monomer mixture having a solvent insoluble content of 5% or lower after completion of polymerization when polymerized as a composition containing no silane monomer, the inner part and the outer part of particles of an aqueous dispersion type pressure-sensitive adhesive are uniformly crosslinked in heat crosslinking, and it is therefore assumed that unsusceptibility to edge peeling and holding performance can be reconciled at high level.

However, in the case of providing a release liner coated with a silane release agent or a back coating layer and producing a pressure-sensitive sheet having a structure such that a pressure-sensitive adhesive layer contacts with such a liner or layer, heavy peeling may occur at a peeling area with the lapse of time. Therefore, further improvement is demanded.

SUMMARY OF THE INVENTION

One object of the present invention is to provide an aqueous dispersion type pressure-sensitive adhesive composition obtained by copolymerizing a monomer mixture comprising one or more alkyl (meth)acrylates as the main component and at least one silane monomer, that shows small increase in a peeling force to a release liner coated with a silicone release agent, or a back coating layer.

Another object of the present invention is to provide a pressure-sensitive adhesive sheet using the aqueous dispersion type pressure-sensitive adhesive composition.

The present inventors made intensive investigations to achieve the above objects. As a result, it was assumed that the reason of increasing a peeling force to a release liner coated with a silicone release agent, or a back coating layer in the case of using an aqueous dispersion type acrylic pressure-sensitive adhesive composition obtained by copolymerizing a monomer mixture comprising one or more alkyl (meth)acrylates as the main component and at least one silane monomer is due to that residual silanol groups on the polymer react with active groups on the surface of a release layer. It has been found that a phenomenon of increasing a peeling force with the passage of time can be prevented by adding a specific amount of an organic compound capable of bonding to a silane monomer to the polymer obtained by copolymerizing a monomer mixture comprising one or more aqueous dispersion type alkyl (meth)acrylates as the main component and at least one silane monomer. It has further found that the phenomenon of increasing a peeling force can further be suppressed by using a methoxysilane monomer as the silane monomer. It has further been found that the phenomenon of increasing a peeling force can further be suppressed by copolymerizing methacrylic acid with the polymer. The present invention has been completed based on those findings.

The aqueous dispersion type pressure-sensitive adhesive composition comprises 100 parts by weight of a polymer obtained by copolymerizing a monomer mixture comprising one or more alkyl (meth)acrylates as the main component and at least one silane monomer, and 0.005–1 part by weight of an organic compound capable of bonding to the silane monomer The pressure-sensitive adhesive sheet comprises a pressure-sensitive adhesive layer comprising the aqueous dispersion type pressure-sensitive adhesive composition.

Figure 1:
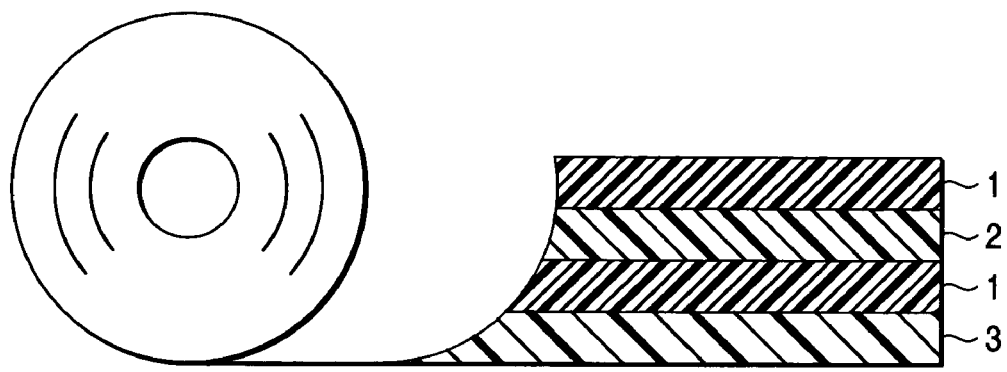
FIG. 1 is a sectional view diagrammatically illustrating one embodiment of the pressure-sensitive adhesive sheet according to the present invention.

in the drawings:
1: pressure-sensitive adhesive layer
2: substrate
3: release liner
4: back coating layer

DETAILED DESCRIPTION OF THE INVENTION

The term "solvent insoluble content" as used herein means the content determined in the following manner. A given amount (about 500 mg) of a sample is precisely weighed out (the weight of nonvolatiles contained therein is represented by $W_1$ (mg)). This sample is immersed in ethyl acetate at room temperature for 3 days. Thereafter, the insoluble matter is taken out and dried at 100° C. for 2 hours. The weight ($W_2$ (mg)) of the dried insoluble matter is measured, and the solvent insoluble content is calculated using the following equation.

Solvent insoluble content (wt %)=$(W_2/W_1) \times 100$

The aqueous dispersion type pressure-sensitive adhesive composition is obtained by adding a silane compound to an aqueous dispersion of a polymer obtained by copolymerizing a monomer mixture comprising one or more alkyl (meth)acrylates as the main component and at least one silane monomer.

Examples of the alkyl (meth)acrylates used as the main constituent monomers include compounds represented by the following formula (1):

$$CH_2=C(R_1)COOR_2 \quad (1)$$

wherein $R_1$ represents a hydrogen atom or methyl, and $R_2$ represents an alkyl group having 2 to 14 carbon atoms.

Examples of $R_2$ include ethyl, propyl, isopropyl, butyl, isobutyl, isoamyl, hexyl, heptyl, 2-ethylhexyl, isooctyl, isononyl and isodecyl. Of these groups, alkyl groups having 2 to 10 carbon atoms, such as butyl or 2-ethylhexyl, are preferable.

The alkyl (meth)acrylates can be used alone or as a mixture of two or more thereof. For example, butyl acrylate alone or a combination of butyl acrylate and 2-ethylhexyl acrylate can be used as the alkyl acrylate(s). In this case, the ratio of the amount of 2-ethylhexyl acrylate to that of butyl acrylate is from about 0/100 to 55/45 (e.g., from 5/95 to 60/40).

In the monomer mixture containing one or more alkyl (meth)acrylates as the main component, the proportion of the alkyl (meth)acrylate(s) (e.g., any of the $C_{2-14}$ alkyl esters of (meth)acrylic acid) is generally 80% by weight or higher (e.g., from about 80 to 99.8% by weight), preferably 85% by weight or higher (e.g., from about 85 to 99.5% by weight), more preferably 90% by weight or higher (e.g., from about 90 to 99% by weight).

The monomer mixture usually contains a functional monomer (monomer containing a heat-crosslinkable functional group) so as to incorporate crosslinkable sites for thermal crosslinking. Use of this functional monomer as a comonomer ingredient also improves adhesion to adherends.

Examples of the functional monomer include carboxyl-containing monomers and anhydrides thereof, such as acrylic acid, methacrylic acid, itaconic acid, maleic acid, crotonic acid or maleic anhydride; hydroxyl-containing monomers such as 2-hydroxyethyl (meth)acrylate, 2-hydroxypropyl (meth)acrylate or 2-hydroxybutyl (meth)acrylate; amide group-containing monomers such as (meth)acrylamide, N,N-dimethyl(meth)acrylamide, N-methylol(meth)acrylamide, N-methoxymethyl(meth)acrylamide or N-butoxymethyl(meth)acrylamide; amino-containing monomers such as dimethylaminoethyl (meth)acrylate or t-butylaminoethyl (meth)acrylate; glycidyl-containing monomers such as glycidyl (meth)acrylate; (meth)acrylonitrile; N-(meth)acryloylmorpholine; and N-vinyl-2-pyrrolidone. Of these, for example, carboxyl-containing monomers such as acrylic acid or methacrylic acid, or anhydrides of thereof are preferable. Especially, methacrylic acid is preferably used in order to suppress a phenomenon of increasing a peeling force with the passage of time. Those functional monomers can be used alone or in combination of two or more thereof.

The amount of the functional monomer used is, for example, from about 0.5 to 12 parts by weight, preferably from about 1 to 8 parts by weight, per 100 parts by weight of the alkyl (meth)acrylate(s).

Other copolymerizable monomers may be contained in the monomer mixture according to need so as to enhance properties such as cohesive force. Examples of such copolymerizable monomers include vinyl esters such as methyl (meth)acrylate or vinyl acetate; aromatic vinyl compounds such as styrene or vinyl toluene; (meth)acrylic esters of cyclic alcohols, such as cyclopentyl di(meth)acrylate or isobornyl (meth)acrylate; and (meth)acrylic esters of polyhydric alcohols, such as neopentyl glycol di(meth)acrylate, hexanediol di(meth)acrylate, propylene glycol di(meth)acrylate, trimethylolpropane tri(meth)acrylate, tetramethylolmethane tri(meth)acrylate or dipentaerythritol hexa(meth)acrylate. These copolymerizable monomers can also be used alone or in combination of two or more thereof.

The silane monomer that is copolymerized with the alkyl (meth)acrylate(s) is not particularly limited as long as it is a polymerizable compound having a silicon atom. However, silane compounds having a (meth)acryloyl group, such as, (meth)acryloyloxyalkylsilane derivatives, are preferred because they have excellent copolymerizability with the alkyl (meth)acrylates. Examples of the silane monomer include 3-methacryloyloxypropyltrimethoxysilane, 3-acryloyloxypropyltrimethoxysilane, 3-methacryloyloxypropyltriethoxysilane, 3-acryloyloxypropyltriethoxysilane, 3-methacryloyloxypropylmethyldimethoxysilane, 3-acryloyloxypropylmethyldimethoxysilane, 3-methacryloyloxypropylmethyldiethoxysilane, and 3-acryloyloxypropylmethyldiethoxysilane. These silane monomers can be used alone or in combination of two or more thereof.

Examples of copolymerizable silane monomers that can be used besides the compounds shown above include vinyltrimethoxysilane, vinyltriethoxysilane, 4-vinylbutyltrimethoxysilane, 4-vinylbutyltriethoxysilane, 8-vinyloctyltrimethoxysilane, 8-vinyloctyltriethoxysilane, 10-methacryloyloxydecyltrimethoxysilane, 10-acryloyloxydecyltrimethoxysilane, 10-methacryloyloxydecyltriethoxysilane, and 10-acryloyloxydecyltriethoxysilane.

Of those silane monomers, a methoxysilane monomer wherein R in Si—OR group of the silane monomer is methyl group is preferably used in order to suppress a phenomenon of increasing a peeling force. Examples of the methoxysilane monomer include 3-methacryloyloxypropyltrimethoxysilane, 3-acryloyloxypropyltrimethoxysilane, 3-methacryloyloxypropylmethyldimethoxysilane, 3-acryloyloxypropylmethyldimethoxysilane, vinyltrimethoxysilane, 4-vinylbutyltrimethoxysilane, 8-vinyloctyltrimethoxysilane, 10-methacryloyloxydecyltrimethoxysilane and 10-acryloyloxydecyltrimethoxysilane.

The amount of the silane monomer used can appropriately be selected according to the kind of the alkyl (meth)acrylate(s), intended use, etc. However, when the silane monomer is copolymerized in an amount exceeding 1 part by weight per 100 parts by weight of the monomer mixture containing one or more alkyl (meth)acrylates as the main component (excluding the silane monomer), there are cases where tackiness decreases to such a degree as to make adhesion impossible. On the other hand, amounts thereof smaller than 0.005 parts by weight tend to result in a deficiency in polymer strength and hence in reduced cohesive force. Consequently, the amount of the silane monomer used is preferably from 0.005 to 1 part by weight, more preferably from 0.01 to 0.5 parts by weight, per 100 parts by weight of the monomer mixture (excluding the silane monomer).

The polymer contained in the aqueous dispersion type pressure-sensitive adhesive composition can be prepared by, for example, subjecting the above-described monomer mixture comprising one or more alkyl (meth)acrylates as the main component and at least one silane monomer, to the conventional emulsion polymerization. Thus, the desired polymer is obtained as a (meth)acrylate copolymer in the form of an aqueous dispersion.

Polymerization methods that can be used in the present invention include general emulsion polymerization techniques such as en bloc polymerization, continuous dropping polymerization or portion-wise dropping polymerization. The polymerization temperature is, for example, from about 20 to 100° C.

Examples of polymerization initiators for use in the polymerization include azo initiators such as 2,2'-azobisisobutyronitrile, 2,2'-azobis(2-methylpropionamidine) disulfate, 2,2'-azobis(2-amidinopropane) dihydrochloride, 2,2'-azobis[2-(5-methyl-2-imidazolin-2-yl)propane] dihydrochloride or 2,2'-azobis(N,N'-dimethyleneisobutylamidine); persulfates such as potassium persulfate or ammonium persulfate; peroxide initiators such as benzoyl peroxide, t-butyl hydroperoxide or hydrogen peroxide; substituted ethane initiators such as phenyl-substituted ethanes; aromatic carbonyl compounds; and redox initiators such as combinations of a persulfate and sodium hydrogen sulfite or combinations of a peroxide and sodium ascorbate. However, polymerization initiators that can be used should not be limited to these examples. The amount of the polymerization initiator used is, for example, from about 0.005 to 1 part by weight per 100 parts by weight of the whole monomer mixture.

A chain transfer agent may be used for the polymerization. Examples of the chain transfer agent include ordinary chain transfer agents such as mercaptans, e.g., dodecanethiol. The amount of the chain transfer agent used is, for example, from about 0.001 to 0.5 parts by weight per 100 parts by weight of the whole monomer mixture.

Examples of emulsifying agents used include anionic emulsifying agents such as sodium lauryl sulfate, ammonium lauryl sulfate, sodium dodecylbenzenesulfonate, sodium polyoxyethylene alkyl ether sulfates, ammonium polyoxyethylene alkylphenyl ether sulfates or sodium polyoxyethylene alkylphenyl ether sulfates; and nonionic emulsifying agents such as polyoxyethylene alkyl ethers or polyoxyethylene alkylphenyl ethers. These emulsifying agents may be used alone or in combination of two or more thereof. The amount of the emulsifying agent used is, for example, from about 0.2 to 10 parts by weight, preferably from about 0.5 to 5 parts by weight, per 100 parts by weight of the whole monomer mixture.

Besides being prepared by the polymerization process described above, the aqueous dispersion type pressure-sensitive adhesive composition may be produced by obtaining the (meth)acrylate copolymer by a method other than emulsion polymerization and then dispersing the copolymer in water with the aid of an emulsifying agent to prepare an aqueous dispersion.

An organic compound capable of bonding to the silane monomer is added to the aqueous (meth)acrylate copolymer dispersion containing the silane monomer. The organic compound capable of bonding to the silane monomer that can be used in the present invention is not particularly limited as long as it has an active group (e.g., hydroxyl or carboxyl) capable of reacting and bonding to Si—OH group which generates by the hydrolysis of an Si—OR group (R is an alkyl group, e.g., methyl or ethyl) of the silane monomer. However, a silane compound having satisfactory reactivity with the silane monomer is desirable.

Examples of the silane compound that can be used in the present invention include compounds having an Si—H group, Si—OH group, or Si—OR group (R is an alkyl group, e.g., methyl or ethyl) in the molecule. Specific examples thereof include methyltrimethoxysilane, butyltrimethoxysilane, dodecyltrimethoxysilane, hexadecyltrimethoxysilane, octadecyldimethylmethoxysilane, dimethoxydimethylsilane, methoxytrimethylsilane, diethoxydimethylsilane, methyltriethoxysilane, phenyltrimethoxysilane, phenyltriethoxysilane, dimethoxydiphenylsilane, diphenylethoxymethylsilane, dimethoxymethylphenylsilane, triethylsilane, tripropylsilane, trimethylsilanol, and triethylsilanol.

Although the silane compound preferably does not have a functional group reactive with the polymer, it may have one or more functional groups having limited reactivity with the polymer. Examples of silane compounds having such a functional group include (meth)acryloyl-containing silane compounds such as 3-methacryloyloxypropyltrimethoxysilane or 3-acryloyloxypropyltrimethoxysilane, dimethoxy-3-mercaptopropylmethylsilane, and 3-mercaptopropyltrimethoxysilane. These silane compounds may be used alone or in combination of two or more thereof.

When the organic compound capable of bonding to the silane monomer is used in an amount smaller than 0.005 parts by weight per 100 parts by weight of the polymer formed mainly from one or more (meth)acrylates, there are cases where increase in peel force with the passage of time cannot be prevented. When the amount of the organic compound exceeds 1 part by weight, there are cases where cohesive force decreases and adherend fouling occurs. Furthermore, when this organic compound capable of bonding to the silane monomer is a polyfunctional compound, there are cases where peel force increases rather than decreases. This may be because when the organic compound partly remains unreacted, this unreacted compound functions as a crosslinking agent. Consequently, in the invention, the amount of the organic compound capable of bonding to the silane monomer is preferably from 0.005 to 1 part by weight, more preferably from 0.01 to 0.5 parts by weight, per 100 parts by weight of the polymer.

A crosslinking agent can be used according to the intended use of the pressure-sensitive adhesive. A crosslinking agent ordinarily used can be used as the crosslinking agent. Examples the crosslinking agent include isocyanate crosslinking agents, epoxy crosslinking agents, oxazoline crosslinking agents, aziridine crosslinking agents, and metal chelate crosslinking agents. Such crosslinking agents may be either oil-soluble or water-soluble.

A tackifier used can also be mixed according to the purpose of use of the pressure-sensitive adhesive. Examples of the tackifier include rosin resins, terpene resins, aliphatic petroleum resins, aromatic petroleum resins, alicyclic petroleum resins, xylene resins and elastomers.

The pH of the aqueous dispersion type pressure-sensitive adhesive composition is usually adjusted to 7 to 9 with a base such as ammonia in order to stabilize the particles. However, in case where the residual ammonia is present in a large amount, the increase in peel force with the passage of time after application to a release liner or back coating layer coated with or formed from a silicone release agent proceeds. It is therefore preferred to add ammonia in a smaller amount. The pH is more preferably adjusted to about 7 to 8.

Other additives ordinarily used in pressure-sensitive adhesives may be contained in the aqueous dispersion type pressure-sensitive adhesive composition according to need. Examples the other additives include aging inhibitors, fillers, pigments, and colorants.

The aqueous dispersion type pressure-sensitive adhesive composition especially preferably is a composition which contains a polymer obtained by polymerizing 100 parts by weight of a monomer mixture comprising one or more alkyl (meth)acrylates as the main component and giving a resin composition having a solvent insoluble content of 5% or lower when polymerized as a composition containing no silane monomer with from 0.005 to 1 part by weight of at least one silane monomer under the same conditions as those used for the polymerization of the composition containing no silane monomer. This aqueous dispersion type pressure-sensitive adhesive composition can reconcile excellent unsusceptibility to edge peeling and high holding power, regardless of the aqueous dispersion type.

The term "under the same conditions" as used above means that the polymerization conditions excluding the presence or absence of a silane monomer, e.g., reaction temperature, reaction time, kind and amount of a polymerization initiator used, and kind and amount of a chain transfer agent used, are equal.

In case where a monomer mixture which gives a resin composition having a solvent insoluble content exceeding 5% when polymerized as a composition containing no silane monomer is polymerized with a silane monomer, an aqueous dispersion type pressure-sensitive adhesive composition containing the resulting polymer is apt to have reduced unsusceptibility to edge peeling.

Embodiments of the pressure-sensitive adhesive sheet of the present invention will be explained below by reference to drawings, but the invention should not be construed as being limited to these in any way.

FIG. 1 is a sectional view diagrammatically illustrating one embodiment of the pressure-sensitive adhesive sheet; this embodiment comprises a substrate film and a pressure-sensitive adhesive layer disposed on both sides of the film.

In FIG. 1, 1 is a pressure-sensitive adhesive layer, 2 is a substrate, and 3 is a release liner. The pressure-sensitive adhesive sheet is obtained by: coating the substrate 2 with an aqueous dispersion type pressure-sensitive adhesive composition obtained by adding a silane compound to an aqueous dispersion of a copolymer of a monomer mixture comprising at least one silane monomer and one or more alkyl (meth)acrylates as the main component; thermally crosslinking the copolymer to form the pressure-sensitive adhesive layers 1; and bonding the release liner 3 to the resulting laminate surface. Although this pressure-sensitive adhesive sheet preferably is wound into a roll as shown in the figure, it may be stored as it is. A method may be used, in which a pressure-sensitive adhesive layer 1 is formed on a release liner 3 and then bonded to the substrate 2. A method may also be used, in which a pressure-sensitive adhesive layer 1 is formed on a release liner 3, and the resulting laminate is then wound as it is, thereby forming a so-called substrate-free, double-faced pressure-sensitive adhesive sheet, which does not contain a substrate.

Examples of materials used as the substrate 2 include plastic films such as polypropylene films, ethylene/propylene copolymer films, polyester films or poly(vinyl chloride) films; papers such as Japanese paper or kraft paper; fabrics such as cotton fabrics or staple-fiber fabrics; nonwoven fabrics such as polyester nonwoven fabrics or vinylon nonwoven fabrics; and metal foils. The plastic films may be either unstretched films or stretched (uniaxially stretched or biaxially stretched) films. The side of the substrate to which the pressure-sensitive adhesive is applied may have undergone a surface treatment with, e.g., a primer in ordinary use or a corona discharge. Although the thickness of the substrate may be suitably selected according to purposes, it is generally from about 10 to 500 µm.

In forming the pressure-sensitive adhesive layers 1, the aqueous dispersion type pressure-sensitive adhesive composition can be applied to the substrate 1 with an ordinary coater such as a gravure roll coater, reverse-roll coater, kiss-roll coater, dip roll coater, bar coater, knife coater or spray coater. The aqueous dispersion type pressure-sensitive adhesive composition is applied so as to result in a pressure-sensitive adhesive layer having a thickness of, for example, from about 10 to 100 µm on a dry basis.

The aqueous dispersion type pressure-sensitive adhesive composition applied is crosslinked by heating to thereby form the pressure-sensitive adhesive layers 1. This thermal crosslinking is accomplished by an ordinary method, for example, by heating the composition to a temperature at which a crosslinking reaction proceeds, according to the kinds of the silane monomer and crosslinking agent. After crosslinking, the pressure-sensitive adhesive layers have a solvent insoluble content of, for example, from about 15 to 70% by weight. The solvent-soluble components of the crosslinked pressure-sensitive adhesive layers have a molecular weight (weight-average molecular weight; calculated for standard polystyrene) of, for example, about from 100,000 to 600,000, preferably about from 200,000 to 450,000. The molecular weights of the solvent-insoluble components and solvent-soluble components of the crosslinked pressure-sensitive adhesive layers can be regulated to any desired values by, for example, suitably regulating the proportions of the silane monomer and functional monomer in the whole monomer mixture and the kinds and amounts of the chain transfer agent and crosslinking agent, in particular, by suitably regulating the amounts of the silane monomer and chain transfer agent.

The release liner 3 comprises a sheet substrate and, disposed on one or each side thereof, a release layer comprising a silicone release agent. This release liner may be the conventional release liner. Although the thickness thereof is not particularly limited, it is preferably 15 μm or larger, more preferably from 25 to 500 μm.

Figure 2:
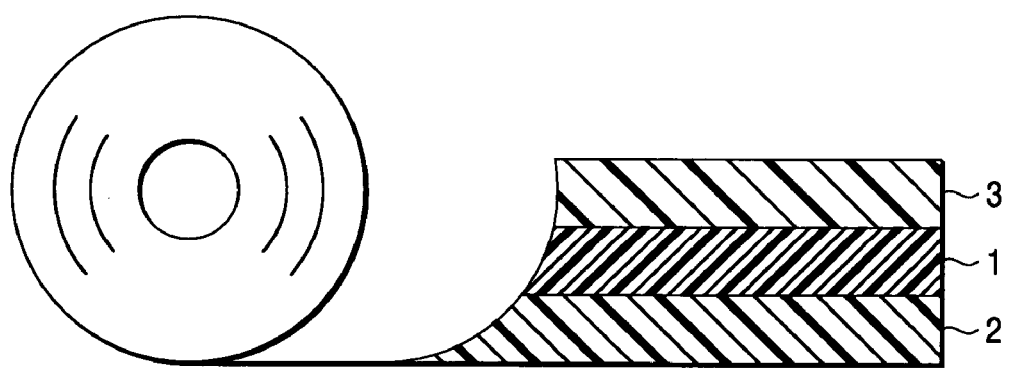
FIG. 2 is a sectional view diagrammatically illustrating another embodiment of the pressure-sensitive adhesive sheet according to the present invention.

FIG. 2 is a sectional view diagrammatically illustrating still another embodiment of the pressure-sensitive adhesive sheet of the invention. This embodiment has a constitution comprising a substrate 2, a pressure-sensitive adhesive layer 1 disposed on one side of the substrate 2, and a release liner 3 applied thereto. Although this pressure-sensitive adhesive sheet preferably is wound into a roll as shown in the figure, it may be stored as it is.

Figure 3:
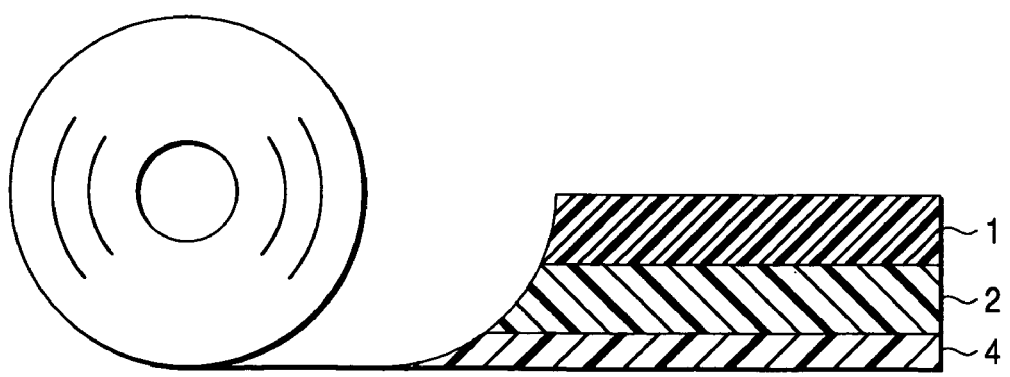
FIG. 3 is a sectional view diagrammatically illustrating still another embodiment of the pressure-sensitive adhesive sheet according to the present invention.

FIG. 3 is a sectional view diagrammatically illustrating a further embodiment of the pressure-sensitive adhesive sheet of the invention. This embodiment has a constitution comprising a substrate 2 on which a back coating layer 4 has been formed and a pressure-sensitive adhesive layer 1 disposed on the substrate 2. As shown in the figure, this pressure-sensitive adhesive sheet is wound so that the pressure-sensitive adhesive layer 1 is in contact with the back coating layer 4, and stored in this roll state.

The back coating layer 4 used can be one formed on the substrate 1 by applying a silicone release agent by the conventional method.

Despite of using the aqueous dispersion type acrylic pressure-sensitive adhesive composition comprising a polymer obtained by copolymerizing a monomer mixture comprising one or more alkyl (meth)acrylates as the main component and at least one silane monomer, and a silane monomer, the present invention can obtain a pressure-sensitive adhesive sheet having a small increased peeling force to a release liner coated with a silicone release agent or a back coating layer with the lapse of time. If the peeling force from the release liner is too large, workability becomes poor. Therefore, the peeling force during the use of the sheet is preferably 1.1 N/50 mm or lower, more preferably 0.2 to 0.6 N/50 mm.

The reasons for exhibiting such excellent effects are not always clear, but it is assumed that the post-added silane compound positively reacts with functional groups remained on the release layer surface, and this suppresses a reaction between a polymer and a release layer. It is also assumed that in the case of using a methoxysilane monomer, the methoxysilane monomer has a fast hydrolysis rate and most of methoxy groups are hydrolyzed into silanol groups, so that most of the silane monomer incorporated into the polymer during drying are consumed for crosslinking, and as a result, the silane monomer capable of reacting with the release layer decreases during the storage. Further, the reason that increase in a peeling force is reduced in the case of using a polymer obtained by copolymerizing methacrylic acid is assumed that methacrylic acid has high hydrophobicity than acrylic acid in an aqueous dispersion and therefore distributes until the inside of fine particles, thereby accelerating hydrolysis of a silane monomer incorporated into the polymer.

The invention will be explained below in greater detail by reference to the following Examples, but the invention should not be construed as being limited to these Examples. Hereinafter, all "parts" and "percents" are by weight unless otherwise indicated.

EXAMPLE 1

A reactor equipped with a condenser tube, nitrogen introduction tube, thermometer, and stirrer was used to conduct polymerization in the following manner. 90 parts of butyl acrylate, 10 parts of 2-ethylhexyl acrylate, 4 parts of acrylic acid, 0.06 parts of 3-methacryloyloxypropyltriethoxysilane ("KBE-503" manufactured by Shin-Etsu Silicone Co., Ltd.), 0.05 parts of dodecanethiol (chain transfer agent), and 0.1 part of 2,2'-azobis[2-(5-methyl-2-imidazolin-2-yl)propane] dihydrochloride (initiator) were added to 100 parts of water containing 1.5 parts of sodium polyoxyethylene lauryl sulfate (emulsifying agent). The resulting mixture was emulsion-polymerized to obtain a polymer. When a mixture having the same composition except that the silane monomer was omitted was polymerized in the same manner, this polymerization yielded a polymer having a solvent insoluble content of 0%.

10% ammonia water was added to the polymer emulsion obtained above to adjust the pH of the emulsion to 8. 0.06 parts of 3-methacryloxypropyl-trimethoxysilane ("KBE-503" manufactured by Shin-Etsu Silicone Co., Ltd.) was added thereto as a silane compound to obtain an aqueous dispersion. 30 parts on a solid basis of a rosin resin ("Super Ester E-100" manufactured by Arakawa Chemical Industries, Ltd.) as a tackifier was added to 100 parts on a solid basis of this dispersion. Thus, an aqueous dispersion type pressure-sensitive adhesive was obtained.

This pressure-sensitive adhesive was applied to the heavy-releasing side of a release liner coated with a silicone release agent (the release liner was "SLB-80W5D" manufactured by Kaito Chemical Industry Co., Ltd.). The coating was dried at 120° C. for 3 minutes to form a pressure-sensitive adhesive layer having a thickness of 50 μm to produce a pressure-sensitive adhesive sheet.

EXAMPLE 2

A pressure-sensitive adhesive sheet was produced in the same manner as in Example 1, except that 0.6 part of n-hexadecyltrimethoxysilane ("AY43-216MC" manufactured by Toray Dow Corning Silicone co., Ltd.) was added as a silane compound in place of 3-methacryloxypropyltrimethoxysilane ("KBE-503" manufactured by Shin-Etsu Silicone Co., Ltd.).

EXAMPLE 3

A pressure-sensitive adhesive sheet was produced in the same manner as in Example 2, except that 0.04 part of n-hexadecyltrimethoxysilane ("AY43-216MC" manufactured by Toray Dow Corning Silicone co., Ltd.) was added as a silane compound.

EXAMPLE 4

A pressure-sensitive adhesive sheet was produced in the same manner as in Example 2, except that 0.02 part of n-hexadecyltrimethoxysilane ("AY43-216MC" manufactured by Toray Dow Corning Silicone co., Ltd.) was added as a silane compound.

EXAMPLE 5

A polymer was obtained by emulsion polymerization in the same manner as in Example 1, except that in the aqueous dispersion type pressure-sensitive adhesive of Example 1, 0.06 part of 3-methacryloyloxypropyltrimethoxysilane ("KBM-503" manufactured by Shin-Etsu Silicone Co., Ltd.) was used as a silane monomer used in polymerization in place of 0.06 part of 3-methacryloyloxypropyltriethoxysilane ("KBE-503" manufactured by Shin-Etsu Silicone Co., Ltd.).

10% ammonia water was added to the polymer emulsion obtained above to adjust the pH of the emulsion to 8. 0.06 parts of n-hexadecyltrimethoxysilane ("AT43-216MC" manufactured by Toray Dow Corning Silicone Co., Ltd.) was added thereto as a silane compound to obtain an aqueous dispersion. 30 parts on a solid basis of a rosin resin ("Super Ester E-100" manufactured by Arakawa Chemical Industries, Ltd.) as a tackifier was added to 100 parts on a solid basis of this dispersion. Thus, an aqueous dispersion type pressure-sensitive adhesive was obtained. Using this adhesive, a pressure-sensitive adhesive sheet was produced in the same manner as in Example 1.

EXAMPLE 6

A pressure-sensitive adhesive sheet was produced in the same manner as in Example 5, except that 0.04 part of n-hexadecyltrimethoxysilane ("AY43-216MC" manufactured by Toray Dow Corning Silicone co., Ltd.) was added as a silane compound.

EXAMPLE 7

A pressure-sensitive adhesive sheet was produced in the same manner as in Example 5, except that 0.02 part of n-hexadecyltrimethoxysilane ("AY43-216MC" manufactured by Toray Dow Corning Silicone co., Ltd.) was added as a silane compound.

EXAMPLE 8

A polymer was obtained by emulsion polymerization in the same manner as in Example 1, except that in the aqueous dispersion type pressure-sensitive adhesive of Example 1, 4 parts of methacrylic acid were used in place of 4 parts of acrylic acid used in polymerization.

10% ammonia water was added to the polymer emulsion obtained above to adjust the pH of the emulsion to 8. 0.06 parts of n-hexadecyltrimethoxysilane ("AT43-216MC" manufactured by Toray Dow Corning Silicone Co., Ltd.) was added thereto as a silane compound to obtain an aqueous dispersion. 30 parts on a solid basis of a rosin resin ("Super Ester E-100" manufactured by Arakawa Chemical Industries, Ltd.) as a tackifier was added to 100 parts on a solid basis of this dispersion. Thus, an aqueous dispersion type pressure-sensitive adhesive was obtained. Using this adhesive, a pressure-sensitive adhesive sheet was produced in the same manner as in Example 1.

EXAMPLE 9

A pressure-sensitive adhesive sheet was produced in the same manner as in Example 8, except that 0.04 part of n-hexadecyltrimethoxysilane ("AY43-216MC" manufactured by Toray Dow Corning Silicone co., Ltd.) was added as a silane compound.

EXAMPLE 10

A pressure-sensitive adhesive sheet was produced in the same manner as in Example 8, except that 0.02 part of n-hexadecyltrimethoxysilane ("AY43-216MC" manufactured by Toray Dow Corning Silicone co., Ltd.) was added as a silane compound.

COMPARATIVE EXAMPLE 1

A pressure-sensitive adhesive sheet was produced in the same manner as in Example 1, except that 3-methacryloxypropyltrimethoxysilane ("KBE-503" manufactured by Shin-Etsu Silicone Co., Ltd.) was not added as a silane compound

COMPARATIVE EXAMPLE 2

A pressure-sensitive adhesive sheet was produced in the same manner as in Example 1, except that 1.2 parts of 3-methacryloxypropyltrimethoxysilane ("KBE-503" manufactured by Shin-Etsu Silicone Co., Ltd.) was added as a silane compound.

COMPARATIVE EXAMPLE 3

A pressure-sensitive adhesive sheet was produced in the same manner as in Example 2, except that 1.2 parts of n-hexadecyltrimethoxysilane ("AY43-216MC" manufactured by Toray Dow Corning Silicone co., Ltd.) was added as a silane compound.

The pressure-sensitive adhesive sheets obtained in the Examples and Comparative Examples given above were examined for the following properties. The results obtained are shown in the Table below.

Peel Force:

Pressure-sensitive adhesive sheet obtained in each of the Examples and Comparative Examples was examined on peel force of a release liner at the initial stage and after storage at 70° C. The measurement of peel force was conducted in the following manner.

A polyethylene terephthalate (PET) film having a thickness of 40 μm was adhered to the respective pressure-sensitive adhesive sheet prepared in each of the Examples and Comparative Examples, and the resulting laminate was cut into a size of 50 mm (width) and 150 mm (length) to prepare a sample for evaluation. The PET film side of the sample was adhered to a coated plate using a double-sided tape, and a force required to peel a release liner was measured. This measurement was made with universal tensile tester "TCM-1kNB" manufactured by Minebea Co., Ltd. under the conditions of 180° peel and a peel rate of 300 mm/min in an atmosphere of 23° C. and 60% RH.

Edge Peeling Test:

The pressure-sensitive adhesive sheet produced in each of the Examples and Comparative Examples was adhered to an aluminum plate having a thickness of 0.5 mm (area: 10 mm×100 mm). The release liner was peeled from the sheet, and the exposed pressure-sensitive adhesive face was adhered to a side surface of a cylindrical acrylic round rod having a diameter of 50 mm. The assembly was placed under an atmosphere at 70° C. for 2 hours, a peel height at the edge of the aluminum plate at that time was measured.

Holding Power Test:

The pressure-sensitive adhesive sheet produced in each of the Examples and Comparative Examples was adhered to a phenolic resin plate with a contact area of 10×20 mm, and after 20 minutes, the assembly was allowed to stand at 80° C. for 20 minutes. The phenolic resin plate was hung down vertically. Uniform load of 600 g was applied to a free edge of the pressure-sensitive adhesive sheet, and time when the sheet fell down at 80° C. was measured.

TABLE

|  | Peel force (N/50 mm) | | | Edge | Holding |
| --- | --- | --- | --- | --- | --- |
|  | Initial | 70° C. × 7 days | 70° C. × 21 days | peeling test (mm) | power (min) |
| Example 1 | 0.18 | 0.36 | 0.58 | 3.5 | 80 |
| Example 2 | 0.23 | 0.47 | 0.62 | 4.0 | 90 |
| Example 3 | 0.26 | 0.65 | 0.84 | 3.6 | 85 |
| Example 4 | 0.28 | 0.85 | 1.02 | 3.3 | 90 |
| Example 5 | 0.22 | 0.28 | 0.32 | 4.2 | 80 |
| Example 6 | 0.23 | 0.38 | 0.44 | 3.9 | 85 |
| Example 7 | 0.23 | 0.47 | 0.56 | 3.8 | 80 |
| Example 8 | 0.18 | 0.34 | 0.39 | 4.0 | 85 |
| Example 9 | 0.19 | 0.40 | 0.47 | 3.8 | 80 |
| Example 10 | 0.21 | 0.44 | 0.54 | 3.8 | 85 |
| Comparative Example 1 | 0.31 | 1.02 | 1.23 | 3.8 | 80 |
| Comparative Example 2 | 0.28 | 1.23 | 2.45 | 4.0 | 85 |
| Comparative Example 3 | 0.27 | 1.12 | 1.98 | 3.5 | 80 |

As apparent from the above Table, in the Comparative Examples in which a silane compound was not added or a silane compound was added in an amount greater than 1 part by weight, a peel force of the release liner increases with the lapse of time, and heavy peeling is remarkable. Contrary to this, in each Example, increase in peel force is reduced while maintaining good unsusceptibility to edge peeking and holding property. In particular, in the case of using a methoxysilane monomer as a silane monomer or in the case of copolymerizing methacrylic acid with a polymer, its effect is remarkable and a pressure-sensitive adhesive sheet having high practical value can be obtained.

As described above, the present invention uses an aqueous dispersion type acrylic pressure-sensitive adhesive and therefore is desirable on environmental health. The aqueous dispersion type acrylic pressure-sensitive adhesive is excellent in a solvent-insoluble content, a molecular weight of a solvent-soluble content and a stability with the lapse of time of an edge peeling property. In particular, in the case of copolymerizing a specific amount of a silane monomer with a monomer mixture giving a polymer having a specified value or less of a solvent-insoluble content, an aqueous dispersion type pressure-sensitive adhesive composition exhibiting remarkably excellent edge peeling property and retention property can be obtained. Such a composition can improve increase in peel force with the lapse of time to a release liner coated with a silicone release agent or a back coating layer. Further, a pressure-sensitive adhesive sheet having high practical value can be obtained using the composition.

It should further be apparent to those skilled in the art that various changes in form and detail of the invention as shown and described above may be made. It is intended that such changes be included within the spirit and scope of the claims appended hereto.

This application is based on Japanese Patent Application No. 2001-270007 filed Sep. 6, 2001, the disclosure of which is incorporated herein by reference in its entirety.

What is claimed is:

1. An aqueous dispersion pressure-sensitive adhesive composition comprising 100 parts by weight of a polymer obtained by copolymerizing a monomer mixture comprising one or more alkyl (meth)acrylates as the maincomponent and at least one silane monomer, and 0.005 to 1 part by weight of an organic compound capable of bonding to the silane monomer.

2. The composition as claimed in claim 1, wherein the polymer is obtained by copolymerizing 100 parts by weight of a monomer mixture comprising one or more alkyl (meth)acrylates as the main component and from 0.005 to 1 part by weight of at least one silane monomer, wherein a comparative polymer has a solvent insoluble content of 5% or lower when obtained by polymerizing the same monomer mixture comprising one or more alkyl (meth)acrylates as the main component without any silane monomer under the same conditions as those used for the polymerization of the composition comprising at least one silane monomer.

3. The composition as claimed in claim 1, wherein the organic compound capable of bonding to the silane monomer is a silane compound.

4. The composition as claimed in claim 1, wherein the silane monomer is a methoxysilane monomer.

5. The composition as claimed in claim 1, wherein the polymer has units of methacrylic acid copolymerized.

6. A pressure-sensitive adhesive sheet comprising a pressure-sensitive adhesive layer comprising the aqueous dispersion pressure-sensitive adhesive composition as claimed in claim 1.

7. The pressure-sensitive adhesive sheet as claimed in claim 6, wherein the pressure-sensitive adhesive layer has a structure such that the layer contacts a release liner coated with a silicone release agent, or a back coating layer comprising a silicone release agent.

8. The pressure-sensitive adhesive sheet as claimed in claim 7, wherein the pressure-sensitive adhesive layer has a peel force to the release liner or back coating layer of 1.1 N/50 mm or lower.

9. The pressure-sensitive adhesive sheet as claimed in claim 7, wherein the pressure-sensitive adhesive layer has a peel force to the release liner or back coating layer of 0.2–0.5 N/50 mm.

10. The pressure-sensitive adhesive sheet as claimed in claim 1, wherein the organic compound is a silane compound.

11. The pressure-sensitive adhesive sheet as claimed in claim 10, wherein the silane compound has an Si—H group, Si—OH group or Si—OR group, wherein R is an alkyl group.

12. The pressure-sensitive adhesive sheet as claimed in claim 10, wherein the silane compound is selected from the group consisting of methyltrimethoxysilane, butyltrimethoxysilane, dodecyltrimethoxysilane, hexadecyltrimethoxysilane, octadecyldimethylmethoxysilane, dimethoxydimethylsilane, methoxytrimethylsilane, diethoxydimethylsilane, methyltriethoxysilane, phenyltrimethoxysilane, phenyltriethoxysilane, dimethoxydiphenylsilane, diphenylethoxymethylsilane, dimethoxymethylphenylsilane, triethylsilane, tripropylsilane, trimethylsilanol, and triethylsilanol.

* * * * *